Aug. 14, 1934.   A. K. HINCHMAN   1,970,142
ELECTRIC VISIBLE SURFACE GAUGE INDICATOR
Filed Feb. 5, 1931    2 Sheets-Sheet 1
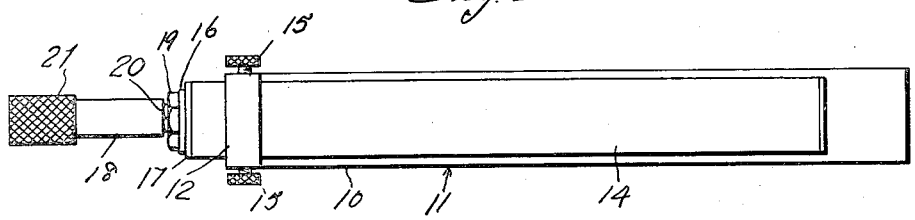
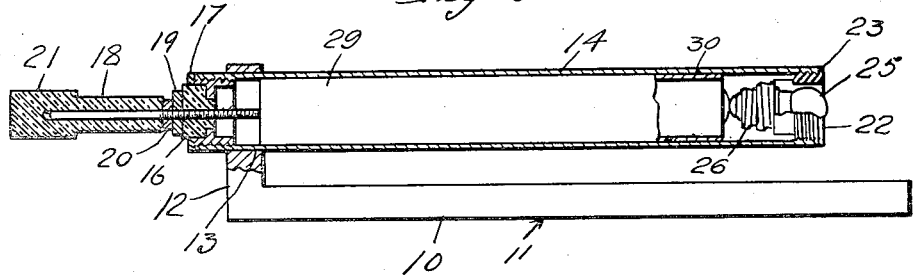
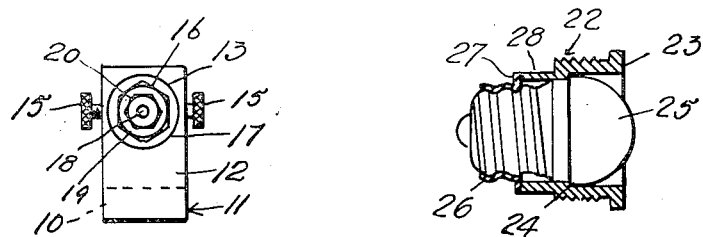
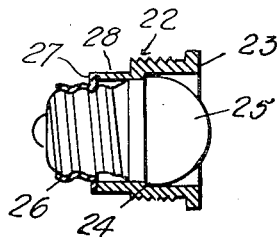
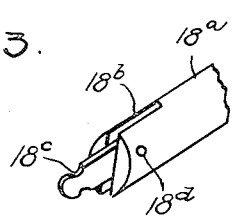
INVENTOR
Alva K. Hinchman
By W. W. Williamson
Atty.

Aug. 14, 1934.        A. K. HINCHMAN         1,970,142
ELECTRIC VISIBLE SURFACE GAUGE INDICATOR
Filed Feb. 5, 1931        2 Sheets-Sheet 2
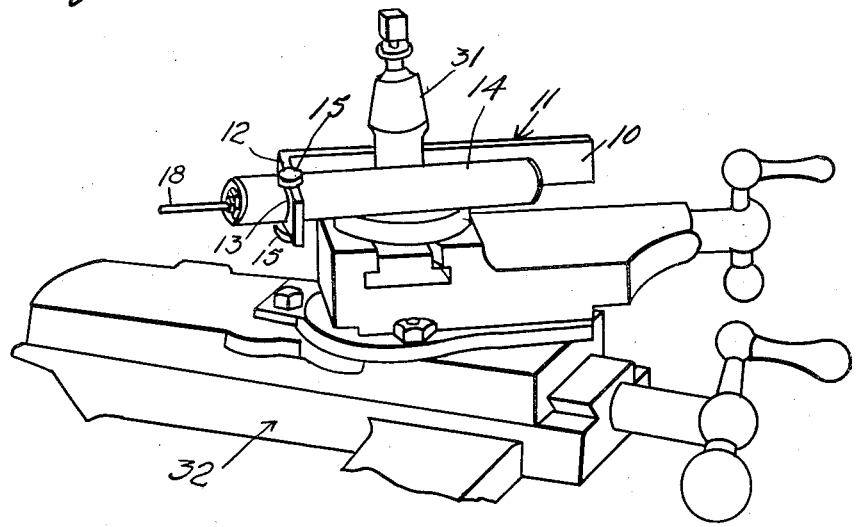
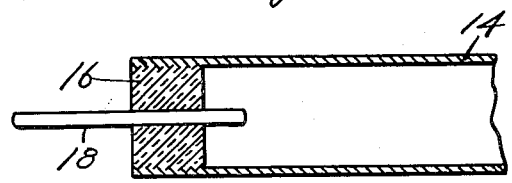
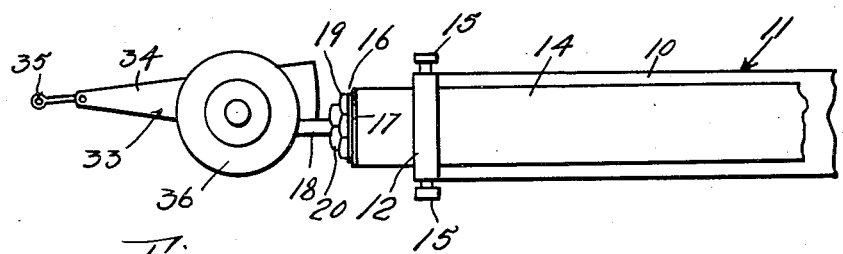

Patented Aug. 14, 1934

1,970,142

UNITED STATES PATENT OFFICE 1,970,142

ELECTRIC VISIBLE SURFACE GAUGE INDICATOR

Alva Kenneth Hinchman, Gloucester, N. J.

Application February 5, 1931, Serial No. 513,469

3 Claims. (Cl. 177—311)

My invention relates to new and useful improvements in an electric visible surface gauge indicator, and has for one of its objects to provide a simple and effective device of this character for use in indicating high spots on work or rotating objects during truing thereof.

Another object of the invention is to construct a device of this character which may be used on a lathe, planer, shaper or the like.

A further object of the invention is to provide a surface gauge indicator including a support, a barrel adjustably mounted in said support and holding a battery, lamp and contact needle, the latter adapted to contact with high spots on a piece of work to complete a circuit through the lamp for giving a visible indication of such high spots.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a side elevation the electric visible surface gauge indicator embodying my invention.

Fig. 2 is a longitudinal section thereof with parts left in elevation.

Fig. 3 is an end view of the same with the needle shield removed.

Fig. 4 is an enlarged section of the lamp housing with the lamp therein illustrated in elevation.

Fig. 5 is a fragmentary perspective view of a modified needle.

Fig. 6 is a view of a tool post of a lathe showing one way of using my invention.

Fig. 7 is an enlarged fragmentary longitudinal section of a modification.

Fig. 8 is a fragmentary side elevation, of the electric indicator illustrating the manner of applying a dial indicator thereto.

In carrying out my invention as herein embodied, 10 represents the shank of a suitable support 11 of electrical conductivity which also has a right angle extension 12. In a hole 13 said extension is slidably mounted a barrel 14 of electric conductivity which is held in any adjusted position by one or more set screws 15 having threaded engagement with the extension 12 and projecting into the hole 13 for contact with the barrel 14.

In the forward end of the barrel is mounted a cap 16 of insulating material, which may be socketed in a collar 17, as in Fig. 2, or directly fitted into the end of said barrel as in Fig. 6. Where a collar is used it is preferably threaded into the barrel or in a similar manner the cap may be mounted directly in the barrel.

A needle or contact member 18, of electrical conductivity is mounted in and passes through the cap 16, and may be threaded into the cap, as in Fig. 2, or snugly fitted in a bore, as in Fig. 6. When threaded, a nut 19 is mounted on the needle and positioned in contact with the cap and said nut 19 may be positively held in place by a lock nut 20.

When the device is not in use the needle or contact member 18 may be enclosed by a shield or sheath 21 to protect the same and said shield is preferably of insulating material so that if the device contacts with some metallic object the electrical circuit will not be completed. The shield snugly fits the needle or contact member and therefore it will not be necessary to provide retaining means.

If found desirable the needle may be provided with a movable point as shown in Fig. 5, wherein 18a is the needle having a slot 18b in its outer end and in which is pivoted the movable point 18c by means of a rivet, pin or equivalent 18d. This arrangement will reduce the likelihood of breakage or other damage to the needle and the possibility of scratching the work should the needle be in the path of travel of an extra high spot on the work.

In the opposite end of the barrel 14, is mounted a lamp housing 22 all of electric conductive material and preferably comprising a bushing 23 screw threaded into said barrel and having an internal shoulder 24 to be engaged by some suitable part of the lamp bulb 25 which will be securely held in place when the sleeve 26 is screwed onto the threaded shank of the bulb and the flange 27 brought into contact with the reduced end of the bushing 23.

The lamp housing may be removed from the barrel without effecting the position of the bulb when access to the barrel is desired but for renewal of the bulb the sleeve is unscrewed from the bulb in the housing after the latter has been removed from the barrel.

A battery 29 having the usual carton or jacket 30 of insulating material surrounding it, is placed in the barrel 14 so that contacts are made between the lamp bulb 25 and one end of said battery and the needle 18 and the opposite end of said battery. The carton or jacket 30 insulates the battery from the barrel 14.

During use the device is placed in the tool post 31 of the machine rest 32 by replacing the tool with the support 11 and when the needle or contact member 18 is in engagement with any part of the work the circuit will be from the battery 29, to needle 18, to work, to machine including the rest and tool post 31, to support 11, to barrel 14, to lamp housing 22, to lamp bulb 25, and back to battery 29, causing said lamp bulb to be lighted.

When a person desires to obtain an indication as to the extent or dimension of a high spot on a piece of work a dial indicator 33, herein illustrated conventionally, is temporarily mounted upon the needle 18. As here shown this dial indicator includes a dial plate 34 on which is pivoted a pointer having a finger 35 for engagement with the work and provided with a clamp structure 36 by which said dial indicator is attached to the needle. The dial indicator 33 being of metal, will cause the lamp bulb to be lighted when the finger 35 engages the work and will show the size of the high spot.

Of course I do not wish to be limited to exact details of construction herein illustrated as these may be varied within the scope of the appended claims without departing from the spirit of my invention.

Having thus fully described my invention what I claim as new and useful, is,

1. In a device of the kind described, a support of electrical conductivity for mounting in a tool post of a machine, said support having a right angle extension with a hole therethrough, a barrel of electrical conductivity mounted in said hole to slide longitudinally for adjustment relative to the support and in electrical contact therewith, means to hold said barrel in any adjusted position, a battery in said barrel, means to insulate the battery from the barrel, a needle of electrical conductivity at one end of said barrel and insulated from the latter and having one end in contact with one terminal of said battery, a lamp housing of electrical conductivity mounted in the other end of the barrel in direct contact therewith and a lamp bulb in said housing and in contact with the other terminal of said battery, the electrical circuit being completed through the machine and the work therein when the needle engages said work.

2. As an article of manufacture, a metal support including a shank and a right angle extension, the latter having a hole therethrough, a metal barrel mounted in said hole to slide longitudinally for adjustment relative to the support and in electrical contact therewith, means to hold the barrel in any adjustment, a metal collar removably mounted in one end of said barrel in direct contact therewith, a block of insulating material in said collar, a needle having a threaded inner end screwed through said insulating block, a metal lamp housing removably mounted in the other end of said barrel and in direct contact therewith, a lamp bulb in said housing, a battery in the barrel having its opposite terminals in engagement with the needle and lamp bulb, and means to insulate the battery from the barrel.

3. A sub-combination in a device of the character described, consisting of a bushing for threaded connection with a battery holding barrel, said bushing having a reduced inner end, an internal shoulder on said bushing, a lamp bulb inserted in said bushing with a portion thereof engaging said shoulder, said bulb having a threaded shank, a threaded sleeve screwed onto said shank, and a flange on said sleeve engaging the iner end of the bushing to draw the bulb into engagement with shoulder and hold said bulb in place.

ALVA KENNETH HINCHMAN.